C. J. HALLUM.
STEERING WHEEL HAND WARMER.
APPLICATION FILED MAR. 8, 1912.
1,079,237.
Patented Nov. 18, 1913.
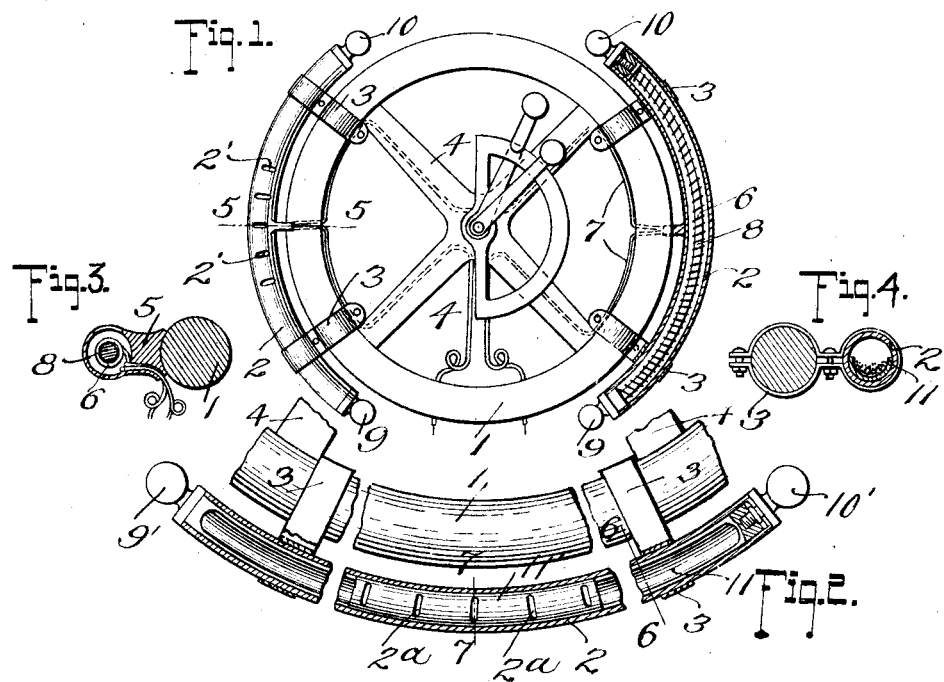
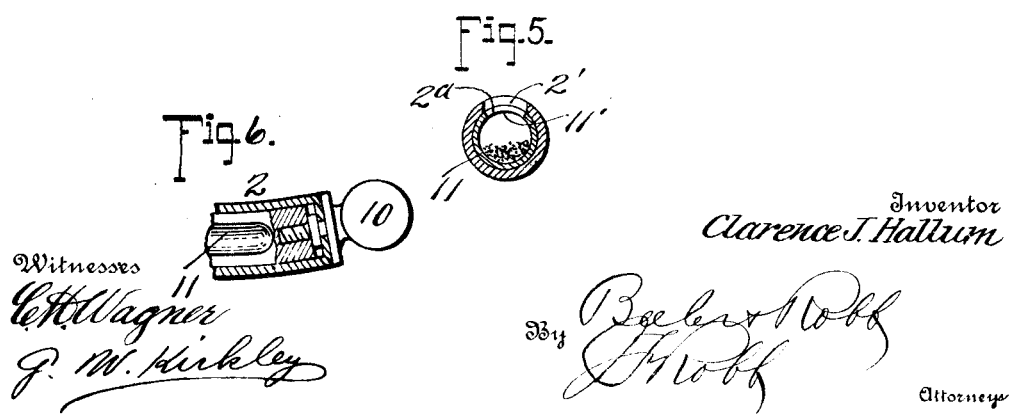
Inventor
Clarence J. Hallum
Witnesses
C. H. Wagner
G. W. Kirkley
By
Attorneys

UNITED STATES PATENT OFFICE.

CLARENCE J. HALLUM, OF WILTON, NORTH DAKOTA.

STEERING-WHEEL HAND-WARMER.

1,079,237.   Specification of Letters Patent.   Patented Nov. 18, 1913.

Application filed March 8, 1912. Serial No. 682,454.

*To all whom it may concern:*

Be it known that I, CLARENCE J. HALLUM, a citizen of the United States, residing at Wilton, in the county of McLean and State of North Dakota, have invented certain new and useful Improvements in Steering-Wheel Hand-Warmers, of which the following is a specification.

The primary object of this invention is to provide a simple detachable means adapted to be applied to steering wheels of motor vehicles, or machines employing a steering shaft and hand wheel for operation of the same, for the purpose of warming the hands grasping the wheel in manipulation thereof.

The invention resides further in the provision of a hand warming attachment susceptible of use in connection with electric or other heating means and which is held in place upon a hand steering wheel by special means coöperating with the spokes of the wheel in order to maintain the warming attachment or heater in its proper position.

For a full understanding of the present invention, reference is to be had to the following description and to the accompanying drawings, in which—

Figure 1 is a top plan view showing warming or heating attachments applied to an ordinary automobile hand steering wheel, one of the devices being shown in section and the other in top plan view. Fig. 2 is a vertical longitudinal sectional view of a modification of the invention. Fig. 3 is a sectional view on the line 5—5 of Fig. 1. Fig. 4 is a sectional view on the line 6—6 of Fig. 2. Fig. 5 is a section on the line 7—7 of Fig. 2. Fig. 6 is an enlarged sectional view showing more clearly the swiveled mounting of the knob by which the fuel pan is moved.

Throughout the following detail description and on the several figures of the drawings, similar parts are referred to by like reference characters.

In the preferred adaptation of the invention, it is contemplated that the heating device or attachment shall constitute a handle or grip when applied to the steering wheel so that the operator's hands when grasping the same will be readily warmed, the heating action of the attachment being regulated by suitable means.

As shown in Fig. 1 of the drawings, an ordinary steering wheel 1 has the invention applied thereto, the heating or warming means comprising a pair of detachable handles 2 of tubular form. The handles 2 are secured to the wheel by the clamps 3 and the latter are so arranged preferably as to engage with spokes 4 of the wheel in such a way as to prevent any circumferential movement of either handle or heating device 2 after the latter has once been attached to the wheel 1. At its middle portion, the handle 2 is provided with a lateral recessed bearing member 5, the outer recessed portion of which forms a seat engaging the adjacent side of the wheel 1 and tending to prevent any pivotal movement of the part 2 such as would carry the same out of the plane of the wheel 1. The member 5 virtually constitutes a stop. The heating attachment 2, as shown in Fig. 1 is of the electrical type, there being a coil 6 arranged in the tubular portion of the device with its terminals suitably connected with wires 7 leading to any suitable source of current generator. The coil 6 may be arranged to surround a bar or core 8, to one end of which is attached a knob or finger piece 9, and the opposite end of the member 8 may have detachable connection with a screw knob 10. The knobs 9 and 10 are, of course, located at opposite ends of the part 2.

As shown in Fig. 2, a modified form of heating means will be utilized, a removable curved fuel pan or tray 11 being inserted in the tubular handle or attachment 2.

As shown in Fig. 1, the attachment 2 has openings 2' in its upper side to permit of escape of heat and the central portion of the tray or pan 11, shown in Fig. 2 is tubular at 11' and formed with openings 2ᵃ adapted to correspond with the openings 2' of the part 2.

Any suitable fuel may be employed for heating the attachment, as shown in Fig. 2, charcoal, punk, or similar fuel being customarily employed. The knob 9' is secured to one end of the fuel pan 11 and the opposite end of the fuel pan has screw connection with the knob 10', the latter being preferably swiveled on the adjacent end of the part 2 so that, by turning the knob 10', a slight sliding movement may be imparted to the pan 11 within the part 2 so as to increase or decrease the extent of registration of the corresponding openings 2' and 2ᵃ, whereby the draft for the fuel in the pan 11 may be regulated readily. As the parts of the device are shown in Fig. 2, the fuel pan 11 is adjusted to occupy a position at the innermost limit of its movement within the part 2. If the knob 10', therefore, is rotated slightly, since said knob is swiveled upon the adjacent end of the part 2, as shown most clearly in Fig. 6, the pan 11 will move longitudinally in the part 2, to thereby vary the relative positions of the openings 2' and 2ª. This movement of the fuel pan is very slight and will probably not exceed one-fourth of an inch in a working device made in accordance with the invention. When the fuel pan is moved longitudinally in the direction of the knob 9', by turning the knob 10' in the manner above described, said knob 9' is forced away from the adjacent end of the part 2, in a manner which will be readily apparent.

Having thus described the invention, what is claimed as new is:

1. A heating attachment for steering wheels, or the like, the same comprising a tubular member having heat escape openings, a heater disposed in said tubular member and having openings to register with those first mentioned, and means for effecting movement of the heater to cause the same to act as a valve, regulating the operative area of the heat escape openings of the tubular member.

2. A heating attachment for steering wheels, or the like, the same comprising a tubular member having heat escape openings, a heater disposed in said tubular member and comprising a fuel receptacle having openings to register with those first mentioned, and means for effecting movement of the heater to cause the same to act as a valve regulating the operative area of the heat escape openings of the tubular member.

3. A heating attachment for steering wheels, or the like, the same comprising a tubular member having heat escape openings, a heater disposed in said tubular member and comprising a curved fuel receptacle having openings to register with those first mentioned, and means for effecting longitudinal movement of the heater to cause the same to act as a valve regulating the operative area of the heat escape openings of the tubular member.

4. A heating attachment for steering wheels, or the like comprising a handle, a heater disposed in said handle and having means at one end for removing it bodily from the handle, and a rotatable member at the other end of the handle operatively connected with the heater to secure the latter from displacement from within the handle.

5. The combination with a hand steering wheel, a heating attachment therefor comprising a tubular member, a heating device in said member, a knob at one end of the tubular member connected with the heating device for removal of the same, and a knob at the other end of said tubular member connected with the heating device for detachably securing the same in position.

6. A heating device for hand steering wheels, the same comprising a tubular member, means for detachably connecting said member with a wheel, a heating device in said member, the tubular member and heating device having corresponding heat escape openings, a knob connected with the heating device at one end for removal of the same, and a knob adjustably connected with the heating device at the other end for adjustment of the same to regulate the size of said openings.

7. A heating attachment for steering wheels or the like, comprising a tubular member adapted to be grasped and used as a handle and having heat escape openings, and a heater mounted in said tubular member and adjustable to control the operative area of said openings.

8. A heating attachment for steering wheels, or the like, comprising a tubular handle, a heater disposed in said handle and having means at one end for removing it from the handle, and means at the other end of the tubular member coacting therewith and with the heater to secure the heater in place in the handle.

In testimony whereof I affix my signature in presence of two witnesses.

CLARENCE J. HALLUM.

Witnesses:
O. ERLING OLSEN,
PETER J. ANDERSON.